United States Patent [19]

Collyear et al.

[11] Patent Number: 4,752,995
[45] Date of Patent: Jun. 28, 1988

[54] MANUFACTURE OF PISTONS

[75] Inventors: John G. Collyear; David A. Parker; Michael L. P. Rhodes, all of Rugby, England

[73] Assignee: AE PLC, Warwickshire, England

[21] Appl. No.: 647,651

[22] Filed: Sep. 6, 1984

[30] Foreign Application Priority Data

Sep. 6, 1983 [GB] United Kingdom ............... 8323843

[51] Int. Cl.⁴ .............................................. B23P 15/10
[52] U.S. Cl. .................................. 29/156.5 R; 29/558; 92/237; 92/239; 123/193 P
[58] Field of Search ............... 29/156.5 R, 557, 558, 29/DIG. 5, DIG. 19, DIG. 26; 92/153, 158, 172, 237, 239; 123/193 P; 82/19; 51/134.5 R; 409/142, 226, 228, 229, 64

[56] References Cited

U.S. PATENT DOCUMENTS

| 2,344,416 | 3/1944 | Scheibe | 92/239 X |
|---|---|---|---|
| 3,438,789 | 4/1969 | Weiss et al. | 92/172 |
| 3,621,617 | 11/1971 | Muller | 82/19 X |
| 3,654,692 | 4/1972 | Goetz | 29/558 |
| 3,732,759 | 5/1973 | Federenko et al. | 82/19 |
| 4,048,975 | 9/1977 | Urquhart | 92/158 X |
| 4,075,934 | 2/1978 | Wecker et al. | 92/158 X |
| 4,535,682 | 8/1985 | Collyear et al. | 123/193 P X |

FOREIGN PATENT DOCUMENTS

| 521933 | 3/1931 | Fed. Rep. of Germany . |
|---|---|---|
| 102930 | 9/1975 | Fed. Rep. of Germany . |
| 3228982A1 | 2/1983 | Fed. Rep. of Germany . |
| 200947 | 6/1923 | United Kingdom . |

OTHER PUBLICATIONS

Federal Republic of Germany, Patenanmeldung M-27434-IB/49l, (Jun. 18, 1955).

Primary Examiner—Howard N. Goldberg
Assistant Examiner—Irene Cuda
Attorney, Agent, or Firm—Leydig, Voit & Mayer

[57] ABSTRACT

A method is disclosed of manufacturing a piston having a skirt on which are formed a plurality of bearing surfaces, each bearing surface being at a predetermined axial position on the skirt, being spaced outwardly of the skirt to a required radial dimension and extending around the skirt with a required circumferential dimension. The method comprises forming the bearing surfaces in at least two stages. First a plurality of projections are formed on a skirt of the piston with each projection being at an axial position in which a bearing surface or surfaces are to be located. The radial and/or axial dimension of the projection exceeds the required corresponding dimension or dimensions of the bearing surfaces. A second step then forms bearing surfaces of the required dimensions. A second form of piston is formed with cylindrical portions which are alternately offset to one side or other of the piston axis to form, one each side of the piston, alternate projecting bearing surfaces and recessed skirt portions.

2 Claims, 3 Drawing Sheets

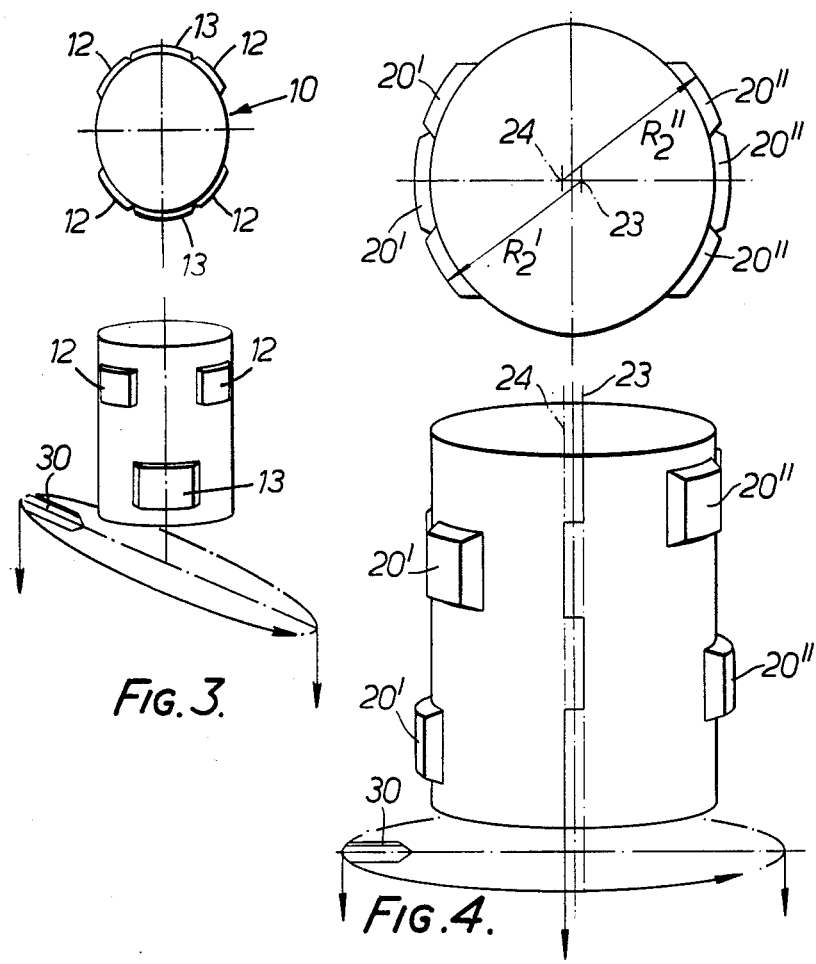
FIG.3.
FIG.4.
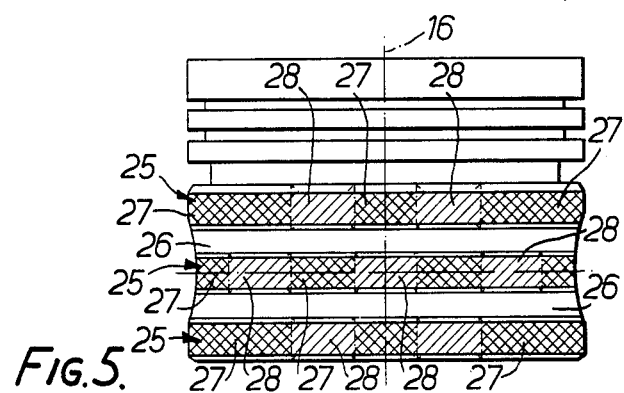
FIG.5.

MANUFACTURE OF PISTONS

BACKGROUND TO THE INVENTION

The invention relates to the manufacture of pistons having a skirt on which are formed a plurality of bearing surfaces for transmitting lateral thrust from the piston to an associated cylinder or liner, each bearing surface being at a predetermined axial position on the skirt, being spaced outwardly of the skirt to a required radial dimension and extending around the skirt with a required circumferential dimension, hereinafter called "a piston of the kind referred to".

It has recently been discovered that improved lubrication and reduced friction between the piston and an associated cylinder or liner can be achieved by replacing the conventional generally cylindrical skirt with such individual bearing surfaces. The bearing surfaces are provided on both the thrust side and the counterthrust side of the piston, which lie on opposite sides of the plane including the piston axis and the axis of a gudgeon pin bore of the piston. Two or more bearing surfaces are provided on each side and can be arranged in various configurations to give optimum performance. The bearing surfaces extend radially outwardly of the surrounding skirt portion by, in general, as little as 25 microns and are connected to the surrounding skirt by sloping ramps. In addition, the circumferential extent of each bearing surface is, in general, 15° or 20°.

It will be appreciated that the small distance by which the bearing surfaces are spaced outwardly of the surrounding skirt and the limited circumferential extent of the bearing surfaces make the manufacture of such a piston more difficult than the manufacture of conventional pistons, which can be made by a conventional turning operation using conventional machine tools. In general, such machines tools do not, however, have sufficient flexibility to machine pistons of the kind referred to above at commercial rates of production.

SUMMARY OF THE INVENTION

According to a first aspect of the invention, there is provided a method of manufacturing a piston of the kind referred to, comprising forming the skirt with a plurality of projections, each projection being at an axial position at which a bearing surface or surfaces are to be located but having a radial and/or axial dimension which exceeds the required corresponding dimension or dimensions of the bearing surface or surfaces, and then machining the projections to form bearing surfaces of the required dimensions.

According to a second aspect of the invention, there is provided a method of manufacturing a piston of the kind referred to comprising machining a piston blank alternately about one or other of two axes which are parallel to the piston axis but which are spaced on opposite sides of the piston axis, to form a succession of radially staggered generally cylindrical portions each of which, relative to the adjacent portions, projects to one side of the piston and is recessed to the other side of the piston, the projections forming the bearing surfaces and the recesses forming the skirt.

According to a third aspect of the invention, there is provided a piston for an internal combustion engine of the kind referred to formed below the ring band with two sets of generally cylindrical portions with one set of said cylindrical portions having a common axis parallel to but spaced from the piston axis and a second set of said cylindrical portions alternating with said one set and having a common axis parallel to but spaced from the piston axis on the opposite side of the piston axis from the axis of said one set, the two sets forming a succession of radially staggered generally cylindrical portions each of which, relative to the adjacent portions projects to one side of the piston and is recessed to the other side of the piston, the projections forming bearing surfaces for the transmission of lateral thrust from the piston to an associated cylinder or liner, and the recesses forming a skirt.

BRIEF DESCRIPTION OF THE DRAWINGS

The following is a more detailed description of some embodiments of the invention, by way of example, reference being made to the accompanying drawings in which:

FIG. 3 is a schematic element and cross-section of a piston of the kind shown in FIGS. 1 and 2, machined to provide the bearing surfaces of part-eliptical shape, FIG. 4 is a schematic elevation and cross-section through a piston of the general type shown in FIG. 1, during manufacture, and showing the machining of axially staggered projections on opposite sides of the piston, FIG. 5 is a side elevation of a further piston of the general type shown in FIG. 1, during manufacture, and showing three projections extending around the piston prior to their machining.

DESCRIPTION OF THE PREFERRED EMBODIMENTS

Figure 1:
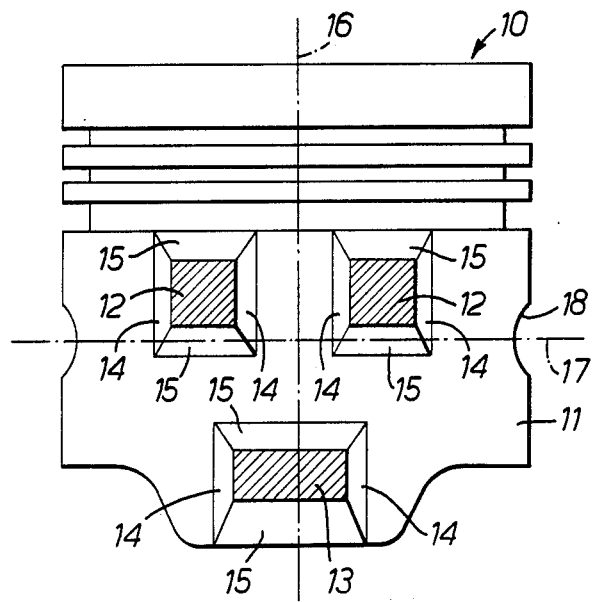
FIG. 1 is a side elevation of a piston for an internal combustion engine showing three bearing surfaces.

Referring first to FIG. 1, the piston 10 shown therein is an example of a piston having a skirt 11 on which are formed a plurality of bearing surfaces in the form of two upper bearing surfaces 12 and a lower bearing surface 13. Each bearing surface 12, 13 is spaced outwardly of the surrounding skirt 11 by, for example, 25 microns with axially and circumferentially extending ramps 14, 15 connecting the bearing surfaces 12, 13 to the surrounding skirt 11. The ramp angle may be no more than 2°. The upper bearing surfaces 12 are axially aligned and are disposed symmetrically on opposite sides of a plane including the piston axis 16 and normal to the axis 17 of a gudgeon pin bore 18 of the piston. The circumferential extent of each upper bearing surface is approximately 15°.

The lower bearing surface 13 is disposed about this plane and has a circumferential extent of approximately 30°.

Similar bearing surfaces are also provided on the portion of the skirt 11 of the piston 10 to the opposite side of a plane including the piston axis 16 and the gudgeon pin bore axis 17. The arrangement of these bearing surfaces may be the same as on the side shown in FIG. 1 or may be different. It may be advisable to have a different arrangement on the opposite side because of the different lateral forces generated on the piston during the compression and expansion strokes of the piston. For this reason, the area or number of bearing surfaces on the thrust side of the piston (i.e. the side which bears against the associated cylinder or liner during the expansion stroke) may be greater than the number or area of the bearing surfaces on the counter-thrust side of the piston (i.e. the side of the piston which bears against the associated cylinder or liner during the compression stroke).

In use, during reciprocation of the piston 10 in an associated cylinder or liner, an oil film left on the associated cylinder or liner by piston rings (not shown) is forced up and over the bearing surfaces as a result of the hydrodynamic wedge action between the ramps 15 and the cylinder or liner. This ensures that there is constant hydrodynamic lubrication over the bearing surfaces in circumstances where otherwise, due to the reduced thrust transmitting area provided by the bearing surfaces, in comparison with a conventional skirt, mixed or boundary lubrication might occur with consequent disadvantageous effects. The hydrodynamic lubrication over the reduced areas of the bearing surfaces ensures that the hydrodynamic friction is minimised, so reducing piston friction.

The following description relates to methods of manufacturing bearing surfaces of the general kind described above with reference to FIG. 1 although it will be appreciated that the methods to be described may be used for producing any required configuration of such bearing surfaces.

Figure 2:
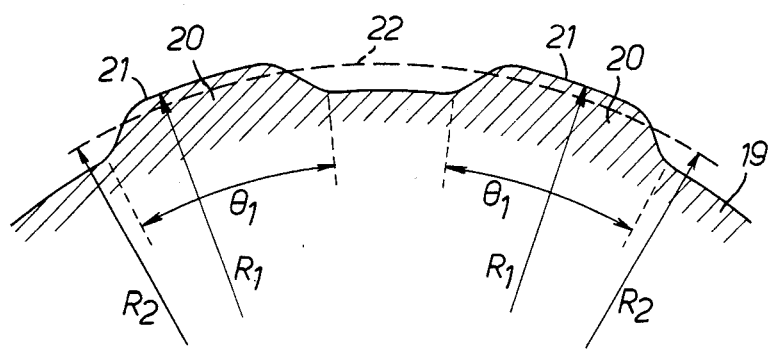
FIG. 2 is a schematic cross-section of part of a piston of the kind shown in FIG. 1 during manufacture and showing projections on the piston and their subsequent machining.

Referring first to FIG. 2, a piston blank 19 is prepared which has a number of projections 20 on its surface. These may be produced by a casting process, such as a squeeze casting process or may be produced by machining from a cylindrical casting. Each projection has an outer surface 21 whose radial dimension $R_1$ is greater than the required radial dimension of the bearing surface which it is to form. The circumferential dimension of each projection, as represented by the angles $\theta_1$, is equal to the required circumferential dimension of the associated bearing surface.

The thus formed piston is then mounted on a machine tool where the radial dimension of the projections 20 is reduced by cutting along the lines 22 in FIG. 2 to the required radial dimension $R_2$ of the bearing surfaces, so forming the bearing surfaces.

The machining may be by use of a machine tool or by use of a milling or grinding machine. The tool may be rotated about an axis co-axial with the axis 16 of the piston. Alternatively, as shown in FIG. 3, the tool 30 may be rotated about an axis inclined at an angle to the piston axis 16. This produces, as shown in the cross-section of FIG. 3, bearing surfaces 12, 13 whose surfaces are part-eliptical. By varying the relative inclination of the axes, the degree of elipticallity can be varied.

Referring next to FIG. 4, the machining step can be simplified if the projections 20' on one side of the piston are axially staggered relative to the projections 20" on the other side of the piston. This allows the projections 20' on one side of the piston to be machined by movement of a tool in a circular path about an axis 23 which is offset from the piston axis 16 and which has a required radius $R_2'$. The other projections 20" are machined by a tool moving in a circular path about an axis 24 which is offset from the piston axis by the same amount as the axis 23, which is diametrically opposite the axis 23, relative to the piston axis 16 and which has a required radius $R_2''$. As shown in FIG. 4, the tool 30 is stepped between these axes during machining in order to machine each side alternately. In this way, both sides of the piston are machined in a single pass by a simple circular machining operation.

It need not be the radial dimension of the projections which is varied relative to that required in the finished bearing surfaces in order to ease production. Additionally or alternatively, the circumferential dimension of the projections could be so varied, and an example of this is shown in FIG. 5.

Referring to FIG. 5, a piston is formed with three axially spaced circumferentially extending projections 25. The surfaces of the projections have a radial dimension which, in the zones where bearing surfaces are to be formed, have the same radial dimension as the required radial dimension of those surfaces.

This initial configuration may be produced in any one of a number of ways. For example, a piston blank could be machined to have a required surface profile and then have two circumferential grooves 26 formed therein in order to define the projections 25. The grooves may be formed by cutting, milling or grinding. Alternatively, the projections 25 could be cast on to the piston and then the surfaces of the projections machined to a required radial dimension. The casting process may be a squeeze casting process.

The next stage in the method is to machine away the portions 27 in order to produce seven bearing surfaces 28 having the required circumferential dimension. This machining may be by use of a milling cutter or may be by grinding.

It will be appreciated that in all the embodiments described above the use of a two-stage piston forming method allows the complex shapes of the bearing surfaces to be produced using non-complex machining methods and non-complex machines such as numerical controlled machine tools or rotating cats-head machines. Although at least two operations are required, they can be performed at commercial speeds and thus can be used to produce such pistons at commercial production rates.

It will be also be appreciated that the pistons of any of the embodiments described above may have any required shape. They may be oval or eliptical in cross-section and/or of varying cross-section along their axis. They may be barrelled. In addition, the bearing surfaces themselves, can have any required shape, they need not be part-cylindrical, they could be part eliptical or oval and may be curved in planes including the piston axis. All of these required shapes can be produced by suitable arrangement of the piston forming methods described above with reference to the drawings.

Figure 6:
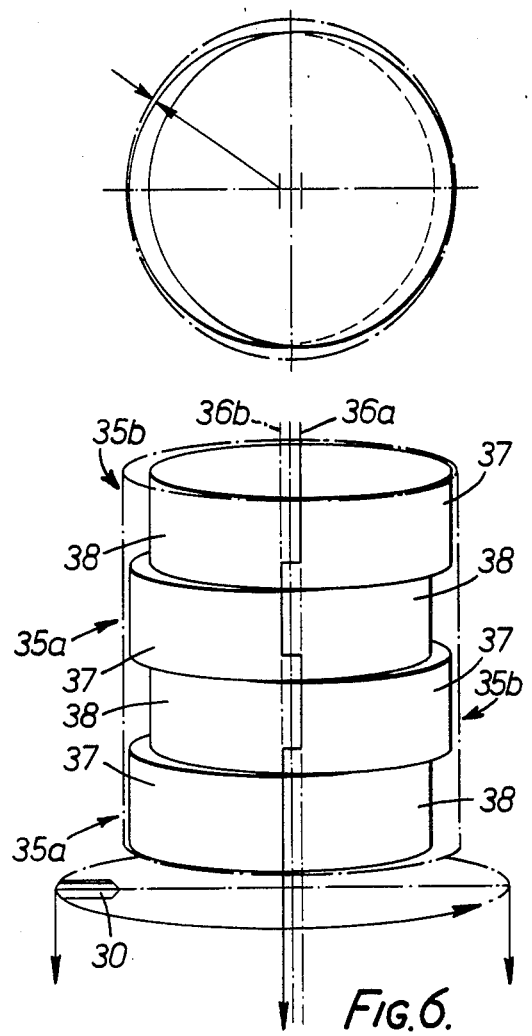
FIG. 6 is an elevation and section of an alternative form of piston operating on the same principle as the piston of FIG. 1.

Referring next to FIG. 6, the alternative form of piston comprises a crown and surrounding ring band (not shown). Below the ring band, the piston is formed with two sets of generally cylindrical portions 35a, 35b. One set of portions 35a has a common axis 36a parallel to but spaced from the piston axis 16. The second set of such portions 35b also have a common axis 36b parallel to but spaced from the piston axis 16 but on the opposite side of the piston axis 16 to the first axis 36a. In this way, there are formed a succession of radially staggered generally cylindrical portions 35a, 35b each of which, relative to the adjacent portions projects to one side of the piston and is recessed to the other side of the piston. The projections form bearing surfaces 37 and the recessed form a skirt 38.

It will be appreciated that the offsets are exagerated in FIG. 6 for the sake of clarity. In practice, the offsets may be of the order of only a few microns, for example 25 microns or up to 125 microns.

The piston of FIG. 6 is manufactured as follows. A generally cylindrical piston blank is machined alternately about one or other of two axes 36a, 36b which are parallel to the piston axis 16 but which are spaced on opposite sides of the piston axis 16. The tool 30 travels in a circular path and is stepped from one axis to the other after predetermined amounts of axial travel.

We claim:

1. A method of manufacturing a piston comprising:

casting a piston having a skirt, forming, in said casting step, a plurality of bearing surfaces on said skirt, each bearing surface having axial and circumferential dimensions which are required final axial and circumferential dimensions of each said bearing surface, but having a radial dimension which exceeds a required radial dimension of each said bearing surface, and then machining said cast piston with a tool to machine each bearing surface to a required radial dimension while leaving the remainder of the skirt unmachined.

2. A method according to claim 1, wherein the machining step comprises rotation of a tool around a piston in a circular path whose axis is parallel to but spaced from the piston axis and which cuts the projections to a constant required radial dimension.

* * * * *